3,810,765
PROCESS FOR PREPARING A COLD-WATER SOLUBLE FAT-CONTAINING POWDERED MILK PRODUCT

Taro Nagasawa, Taizo Ryoki, Takashi Shinozaki, Tadashi Watanabe, and Mitsuru Kanayama, Tokyo, Japan, assignors to Morinaga Milk Industry Co., Ltd.
No Drawing. Filed May 12, 1971, Ser. No. 142,738
Claims priority, application Japan, May 18, 1970, 45/41,672
Int. Cl. A23j 1/20
U.S. Cl. 426—92
6 Claims

ABSTRACT OF THE DISCLOSURE

A fat-containing powdered milk product which is readily soluble in cold water can be obtained by mixing a powdered milk with a kneaded, powdered lecithin-sugar mixture prepared by making 0.2 to 1.5%, based on the weight of final product, of lecithin to be adsorbed in a water soluble saccharide.

CROSS REFERENCE TO A RELATED APPLICATION

Priority of the corresponding Japanese patent application No. 41,672/1970 filed on May 18, 1970 is claimed under convention.

BACKGROUND OF THE INVENTION

Field of the invention

The present invention relates to a process for preparing a fat-containing powdered milk product which is readily soluble in cold water.

The prior art

The property of whole milk powder varies depending on the breed of cow, milking time, kinds of fodder, etc. and is usually 33 to 35° C. When the whole milk powder is dissolved in water at a temperature below the melting point of fat, a sticky lump is formed which floats on the surface. It does not sink because only the outer surface thereof is wetted with water but not the inner part and it is difficult to dissolve whole milk powder in cold water. This deficiency is greater when a cream powdered milk is involved, which is higher in fat content than the whole milk powder. This trend is more remarkable for a cream powdered milk which is higher in fat content than the whole milk powder.

A method for sinking a whole milk powder or cream powdered milk in cold water is known characterized by mixing such powdered milk with 0.2 to 4%, by weight, of liquid anhydrous surface active agent.

However, it is difficult to mix such a small amount of a surface active agent as 0.2 to 4%, by weight, with a large amount of powdered milk as 99.8 to 96%, by weight. This is true also when the mixing is conducted while diluting stepwise the surface active agent with the powdered milk by a mechanical treatment such as jet grinding at the time of the stepwise dilution, since the surface active agent is liquid. When the powdered milk containing fat is ground, the fat is eluted and, when it is reduced with water, an oil droplet is formed and the product becomes unsuitable for use.

The prior art further discloses a method of mixing the powdered milk with a surface active agent after dissolving the surface active agent in an organic solvent such as petroleum ether for improving the mixing of them. The organic solvent cannot be used for manufacture of foodstuff and this method in actual manufacture is extremely difficult.

U.S. Pat. No. 3,120,438 relating to a process for preparing a fat-containing milk product readily soluble in cold water characterized by coating 0.2 to 1.5% of liquid lecithin onto a whole milk powder by means of a springer or a combined apparatus of high pressure pump and nozzle in a ribbon mixer. However, this method results in producing another portion well coated with lecithin and a portion poorly coated therewith. In the portion well coated with lecithin powdered milk particles combine together with one another to form a so-called "balling up" effect. Therefore, the actual manufacture thereof is difficult and also the resulting product is remarkably irregular in sinkability in cold water because it is non-uniform.

SUMMARY OF THE INVENTION

As a result of researches for improving these defects of the prior art, the present inventors have made it possible to industrially produce a fat-containing powdered milk product readily soluble in cold water in a simple process, which has hitherto been technically impossible, and further have improved a whole milk powder and cream powdered cream and their equivalents containing an edible animal or vegetable fat and oil, so that they can be easily utilized at home while similar products of the prior art could not be utilized in the summer season, being insoluble in cold water.

DESCRIPTION OF THE PREFERRED EMBODIMENTS

The process of the present invention is a process for preparing a fat-containing powdered milk product such as a whole milk powder and cream powdered milk or their equivalents which are readily wettable and sinkable even in cold water at 0 to 10° C. An amount of lecithin calculated to represent in the final product 0.2 to 1.5%, by weight, is placed into an apparatus having a grinding action such as a mortar and a grinder, where it is mixed with a monosaccharide or disaccharide, readily soluble in water, to form a lecithin-sugars mixture. Thereafter the mixture is mixed with a powder such as a whole milk powder, powdered cream or their equivalents containing an edible animal or vegetable fat and oil. For purposes of this application and claims these materials are defined as a powdered milk product.

The water solubilizing process involves preparing a powder of lecithin-sugar mixture of a liquid lecithin adsorbed in a monosaccharide or disaccharide, readily soluble in water. In an apparatus having a grinding action, such as a mortar and a grinder. The resulting powder is mixed with a whole powdered milk product containing the fat and oil in a solid phase. For this step of a powder mixer, which does not deliver a grinding action, such as a ribbon mixer is employed and a V-type mixer to allow lecithin to pass into the outer surface of the powdered milk.

Therefore, the resulting product does not have fat eluted therefrom and its quality does not deteriorate. When dissolving a powdered milk product in cold water, its sinkability is important, so that it can be easily dissolved by stirring.

According to Canadian Journal of Technology, 32, 60 (1954), when mixing with sugars whole milk powder is improved in wettability to sink and dissolve in water. The present inventors conducted an experiment on the actual amount of sugars to be added for wetting a whole milk powder and sinking it in cold water at 0 to 10° C. and the result as shown in Table 1 was obtained.

TABLE 1

| Sugars | | Mixing ratio | | Sinkability velocity, seconds[1] | |
|---|---|---|---|---|---|
| Kinds | Solubility at 25° C., wt. percent | Total powder, percent | Sugars, percent | 0° C. | 10° C. |
| Sorbitol | 83 | 25 | 75 | A | A |
| | | 20 | 80 | A | 130 |
| | | 15 | 85 | 15 | 4 |
| Glucose | 50 | 10 | 90 | A | 140 |
| | | 5 | 95 | 90 | 41 |
| | | 2.5 | 97.5 | 38 | 21 |
| α-Lactose | 16.7 | 15 | 85 | A | 150 |
| | | 10 | 90 | 135 | 105 |
| | | 5 | 95 | 50 | 30 |
| Saccharose | 66.6 | 20 | 80 | A | A |
| | | 15 | 85 | A | 120 |
| | | 10 | 90 | 4 | 2 |

[1] The sinking velocity was determined by adding 2 g. of a mixture of sugars and whole milk powder in 50 cc. of cold water at 0° C. or 10° C. and measuring the sinking time of these powders to below the surface of the water by means of a stop watch.

NOTE.—A=Only one-half of the powder sinks even after 180 seconds in water.

As the result of these experiments, it has been found that the amount of sugars necessary to sink the mix in cold water at 0 to 10° C. varies with the kinds of sugars. This is considered to be due to differences in solubility and particle size of sugars. If the amount of sugars to be mixed is not above 85%, by weight, based on that of whole milk powder, it does not sink in cold water at 0 to 10° C. even if the sugar is sorbitol which is the highest in solubility for water.

In case of a cream powdered milk which is higher in fat percentage than the whole milk powder, if the ratio of sugars to be mixed is not further increased, it is impossible to improve the sinkability at 0 to 10° C. However, in case the mixing ratio of sugars is so high as described above, the characteristic of whole milk powder or cream powdered milk is missing.

As a result of researches for improving the above described defects while decreasing the amount of sugars to be mixed, the present inventors have found that, when mixing a whole milk powder product with such an amount of lecithin that its content in the final product is 0.2 to 1.5%, by weight, after making lecithin to be adsorbed in sugars, the product is rapidly wetted and sinks, and that the mixing ratio of the whole milk powder product can be changed by the above described method.

Next, the process of the present invention will be illustrated in detail.

The process of the present invention comprises two steps, one being the step of mixing sugars with lecithin and another being the step of mixing the resulting mixture with a powdered milk.

As sugars used for mixing with lecithin, a monosaccharide or disaccharide which is powdery and rather readily soluble in water is preferable. Lactose can be sufficiently used in the present invention although among disaccharides it is the lowest in solubility with 16.7% at 25° C.

A trisaccharide and higher sugars cannot be used in the present invention, except for a particular one, because they are low in solubility in water and are not dissolved in water even if a powdered milk is dissolved in water.

Lecithin is a kind of phosphatide and is contained in a soya bean, a cotton seed, a hen's egg, cow's milk, etc. And usually lecithin on the market contains phosphatidyl choline (lecithin), phosphatidyl ethanol amine, phosphatidyl serine, phospho inositide, a carbohydrate, sterol, tocopherol, etc.

Lecithin which is generally used is soya bean lecithin on the market is 28,000 to 40,000 cps. in viscosity at 30° C. Its composition is 20% of phosphatidyl choline (lecithin), 10% of phosphatidyl ethanol amine, 10% of phosphatidyl serine, 21% of phospho inositide, 5% of carbohydrate, 2% of sterol and tocopherol, and 3.2% of soya bean oil. Thus, the content of phosphatide is about 61%.

The step of making lecithin to be adsorbed in sugars to form so-called a lecithin-sugars mixture is important in the process of the present invention. Lecithin is not adsorbed in sugars under common stirring since it is high in viscosity.

In the process of the present invention, a powdery lecithin-sugars mixture can be obtained after placing lecithin into an apparatus having a grinding action such as a mortar, an earthenware mortar, a grinding machine, etc., by slowly adding sugars thereto, so that the lecithin may be adsorbed in sugar under kneading. Sugars take lecithin into an unlimited extent and change liquid lecithin to powdery. The powdery lecithin-sugars mixture can be easily mixed with a whole milk powder product by means of the conventional powder mixer in the subsequent step.

The whole milk powder used in the second step is one prepared by removing almost all water content from all milk and drying it to powdery. The product usually contains about 26% of fat. The cream powdered milk used in the present invention is prepared by removing almost all water content from cream and drying it to powdery. The cream powdered milk used for purpose of the present invention has a 30 to 50% in fat as the optimum. In case the fat percentage is below 30% the product runs short in cream texture. If the fat percentage is above 50%, the cream powdered milk is low in specific gravity and is difficult to mix with sugars containing lecithin.

Next, the sinkability of products prepared by changing the amount of lecithin added and the mixing ratio of the milk powder product will be described together with the result of an experiment on the lecithin content for wetting and sinking a whole milk powder in cold water at 0 to 10° C. This and the mixing percentage of α-lactose which is the lowest in solubility among monosaccharides and disaccharides obtained in industrial scale are as shown in Table 2. The same in case of sorbitol, which is the highest in solubility is shown in Table 3. The result of experiment on the lecithin content for wetting and sinking a cream powdered milk of 35% in fat prepared by using the method described in Japanese patent publication Gazette No. 9130/55 in cold water at 0 to 10° C. and the mixing percentage of α-lactose which is the lowest in solubility among monosaccharides and disaccharides is as shown in Table 4, and that in case of sorbitol which is the highest in solubility is shown in Table 5.

TABLE 2.—CASE OF WHOLE MILK POWDER AND α-LACTOSE

| Experiment number | Percent | | | Sinking velocity, seconds | |
|---|---|---|---|---|---|
| | Lecithin content | Whole milk powder | α-Lactose | 0° C. | 10° C. |
| 1 | 1.5 | 95 | 3.5 | 105 | 30 |
| 2 | 1.25 | 90 | 8.75 | 100 | 30 |
| 3 | 1.0 | 85 | 14 | 80 | 20 |
| 4 | 0.75 | 80 | 19.25 | 80 | 20 |
| 5 | 0.5 | 70 | 29.5 | 75 | 20 |
| 6 | 0.4 | 60 | 39.6 | 70 | 20 |
| 7 | 0.2 | 50 | 48.8 | 70 | 20 |
| 8 | 0 | 50 | 50 | (¹) | (¹) |

[1] Floats on surface but does not sink.

TABLE 3.—CASE OF WHOLE MILK POWDER AND SORBITOL

| Experiment number | Percent | | | Sinking velocity, seconds | |
| --- | --- | --- | --- | --- | --- |
| | Lecithin content | Whole milk powder | α-Sorbitol | 0° C. | 10° C. |
| 1 | 1.5 | 95 | 3.5 | 100 | 25 |
| 2 | 1.25 | 90 | 8.75 | 100 | 25 |
| 3 | 1.0 | 85 | 14 | 70 | 20 |
| 4 | 0.75 | 80 | 19.25 | 50 | 15 |
| 5 | 0.5 | 70 | 29.5 | 45 | 10 |
| 6 | 0.4 | 60 | 39.6 | 40 | 10 |
| 7 | 0.2 | 50 | 48.8 | 40 | 10 |
| 8 | 0 | 50 | 50 | (¹) | (¹) |

¹ Floats on surface but does not sink.

TABLE 4.—CASE OF WHOLE MILK POWDER AND α-LACTOSE

| Experiment No. | Percent | | | Sinking velocity, seconds | |
| --- | --- | --- | --- | --- | --- |
| | Lecithin content | Cream powdered milk | α-Lactose | 0° C. | 10° C. |
| 1 | 1.5 | 95 | 3.5 | 120 | 50 |
| 2 | 1.25 | 90 | 8.75 | 115 | 45 |
| 3 | 1.0 | 85 | 14 | 100 | 40 |
| 4 | 0.75 | 80 | 19.25 | 87 | 40 |
| 5 | 0.5 | 70 | 29.5 | 80 | 35 |
| 6 | 0.4 | 60 | 39.6 | 75 | 35 |
| 7 | 0.2 | 50 | 48.8 | 75 | 35 |
| 8 | 0 | 50 | 50 | (¹) | (¹) |
| 9 | 0 | 30 | 70 | (¹) | (¹) |
| 10 | 0 | 15 | 85 | (¹) | (¹) |
| 11 | 0 | 5 | 95 | 84 | 40 |

¹ Floats on surface but does not sink.

TABLE 5.—CASE OF WHOLE MILK POWDER AND SORBITOL

| Experiment No. | Percent | | | Sinking velocity, seconds | |
| --- | --- | --- | --- | --- | --- |
| | Lecithin content | Cream powdered milk | α-Sorbitol | 0° C. | 10° C. |
| 1 | 1.5 | 95 | 3.5 | 100 | 30 |
| 2 | 1.25 | 90 | 8.75 | 100 | 30 |
| 3 | 1.0 | 85 | 14 | 90 | 30 |
| 4 | 0.75 | 80 | 19.25 | 80 | 25 |
| 5 | 0.5 | 70 | 29.5 | 65 | 20 |
| 6 | 0.4 | 60 | 39.6 | 55 | 15 |
| 7 | 0.2 | 50 | 48.8 | 55 | 15 |
| 8 | 0 | 50 | 50 | (¹) | (¹) |
| 9 | 0 | 40 | 60 | (¹) | (¹) |
| 10 | 0 | 25 | 75 | (¹) | (¹) |
| 11 | 0 | 15 | 85 | 38 | 15 |

¹ Floats on surface but does not sink.

Next, the present invention will be explained on the above Tables 2 to 5.

In Table 2, on dissolving in cold water at 0° C., a mixture of 50% of whole milk powder and 50% of α-lactose floated on the surface of water but did not sink while the same mixture containing lecithin sank in 70 seconds. A mixture (powdered mik) of whole milk powder increased and α-lactose decreased to 3.5% sank in 105 seconds. It may be safely assumed in practice that it sinks in two minutes (120 seconds). The rate of lecithin to be actually added is desirably below 1.5%, by weight, based on the total amount since, when the lecithin content is above 1.5%, taste and smell peculiar to lecithin emanate.

And also the ratio of whole milk powder is increased with the amount of lecithin added. In order to maintain the ratio of whole milk powder in 50%, it is necessary to add at least 0.2%, by weight, (based on the total amount), of lecithin thereto since, when the amount of whole milk powder decreases to below 50% and sugars are increased, the characteristic property of the product is missing.

In case of water at 10° C. a whole milk powder added with lecithin sinks in 20 to 30 seconds.

Table 3 shows the sinkability of the product having used whole milk powder and sorbitol as sugars, which is higher in sinking velocity in cold water at 0° C. and 10° C. in comparison with that in the same mixing ratio of whole milk powder and sugar in Table 2 because sorbitol is higher than α-lactose in solubility.

Tables 4 and 5 show the sinkability when using cream powdered milk instead of whole milk powder in Tables 2 and 3. In either cases it is necessary to add at least 0.2% of lecithin for a product containing above 50% of cream powdered milk.

The conventional whole milk powder, product was not wetted, did not sink, and remained floating on the surface of cold water at a temperature of below the melting point of fat contained therein. In order to remove the above defects, it was necessary to add above 85%, by weight, of sugars thereto. However, it has become possible to obtain a product which is readily soluble in cold water by adding a small amount of sugars in accordance with the present invention.

Another result of the process of the present invention is the uniformity of the product. A product obtained by the conventional method, for example, by jetting a solution of lecithin as described in U.S. Pat. No. 3,120,438 tends to lump and is unsatisfactory in uniformity. In contrast the product according to the process of the present invention is excellent in uniformity since it is prepared by mixing and kneading lecithin with sugars and mixing the resulting mixture with powdered milk in a solid phase.

As described above, the present invention provides a novel process for industrially manufacturing a fat-containing powdered milk product which is wetted in cold water at 0 to 10° C. and sinks within 120 seconds even though the amount of sugars used is small.

The present invention will be explained on the following examples:

EXAMPLE 1

Immediately after heating a cow's milk of 3.2% in fat percentage and 8.2% in milk solid content at 80° C. for 10 minutes, the cow's milk was concentrated and dried to obtain a whole milk powder of 26.3% in fat percentage, 7.07% in milk solid content and 3.0% in water content. 50 g. of lecithin on the market manufactured by Ajinomoto Co., Ltd. were placed in a 5 l.-grinding machine (manufactured by Ishikawa Works) and 950 g. of saccharose were gradually added thereto under rotating a grinding rod to obtain 1000 g. of powdery lecithin-saccharose mixture.

Next, 4000 g. of the above described whole milk powder and 1000 g. of lecithin-saccharose mixture were placed in a 20 l. V-type mixer (manufactured by Tokuju Works) and mixed by operating it for 10 minutes to obtain a whole milk powder like fat-containing powdered milk product of 21% in fat percentage, 56.6% in milk solid content, 19% in saccharose, 1% in lecithin, and 2.4% in water content. When 2 g. of the product so obtained were added to 50 cc. of water at 0° C., the product was wetted and sank in 75 seconds, and, in case of water at 10° C., it was wetted and sank in 20 seconds.

EXAMPLE 2

A cream powdered milk of 35% in fat percentage, 7.5% in protein, 1.9% in ash, 53.6% in lactose and 2% in water content was obtained according to the method of Japanese Patent Publication Gazette No. 9135/55. 75 g. of lecithin on the market by Ajinomoto Co., Ltd. were placed in a 5 l. grinding machine and 175 g. of α-lactose were slowly added thereto under rotating a grinding rod to obtain 250 g. of powdery lecithin-α-lactose mixture.

Next, 4750 g. of the above described cream powdered milk and 250 g. of lecithin-α-lactose mixture were placed in a 20 l. V-type mixer and mixed under rotating it for 10 minutes to obtain a cream powdered milk like fat-containing powdered milk product of 33.2% in fat percentage, 7.1% in protein, 1.8% in ash, 54.4% in α-lactose, 1.5% in lecithin and 2% in water content.

The product of the present invention sank in cold water at 0° C. in 120 seconds and in cold water at 10° C. in 50 seconds while a cream powdered milk obtained according to the method of Japanese Patent Publication Gazette No. 9135/55 was not wetted in water at a temperature of below the melting point of fat and did not sink.

EXAMPLE 3

3.2 kg. of hardened coconut oil of 35° C. in melting point were added to 96.8 kg. of skim milk of 8.2% in milk solid content, heated to 65° C., and, after homogenizing treating in 150 kg./cm.$^2$ by means of a three series type homogenizer (manufactured by Sanmaru Rakunoki Works), pasteurized at 80° C. for 10 minutes and immediately concentrated and dried to obtain 9.5 kg. of synthetic powdered milk of 26.3% in vegetable fat, 70.5% in milk solid content and 3.2% in water content (yield 82.6%).

Next, 25 g. of lecithin on the market manufactured by Ajinomoto Co., Ltd. were placed in a 5 l. grinding machine and 1475 g. of glucose were slowly added thereto under rotating a grinding rod to obtain 1500 g. of powderly lecithin-glucose mixture. Further, 3500 g. of the above described synthetic powdered milk and 1500 g. of lecithin-glucose mixture were placed in a 20 l. V-type mixer and mixed under operating it to obtain a fat-containing powdered milk product of 18.4% in fat percentage, 49.3% in milk solid content, 29.5% in glucose, 0.5% in lecithin and 23% in water content. When the product so obtained was added to 50 cc. of water at 0° C., the product was wetted and sank in 65 seconds, and, in case of water at 10° C., it was wetted and sank in 30 seconds.

A fat-containing powdered milk product obtained by mixing 3500 g. of the above described synthetic powdered milk and 1500 g. of glucose my means of a V-type mixer did not sink in water at a temperature of below the melting point of fat (i.e. at 35° C.).

What is claimed is:

1. A process for preparing a fat-containing powdered milk product, readily soluble in cold water of a temperature below 10° C., comprising the steps of:
    firstly adsorbing lecithin into a water soluble sugar into a powdered lecithin-sugar mixture,
    secondly kneading said powdered lecithin-sugar mixture; having
    a lecithin content of about 0.2% to 1.5%, by weight, and
    thirdly mixing a powdered milk with the said powdered lecithin-sugar mixture into a particle composition with lecithin dispersed on the surface of the said particle composition.

2. The process as set forth in claim 1 wherein the powdered milk is whole milk product powder.

3. The process as set forth in claim 1 wherein the powdered milk product is a powdered cream.

4. The process as set forth in claim 1 wherein the powdered milk product contains an edible fat and oil.

5. The process as set forth in claim 1, wherein the water soluble sugar is a saccharide selected from a group consisting of monosaccharide and disaccharide.

6. A cold water soluble fat-containing powdered milk product prepared by the process as set forth in claim 1 having a sinkability of less than 120 seconds in sinking velocity in cold water of a temperature below 10° C. comprising a composition of a lecithin and a water soluble sugar-mixture with a lecithin content of about 0.2% to 1.5%, by weight, with a powdered milk, with said lecithin dispersed on the surface of the said composition.

References Cited
UNITED STATES PATENTS

| | | | |
|---|---|---|---|
| 3,278,310 | 10/1966 | Williams et al. | 99—56 |
| 2,399,565 | 4/1946 | Evanston et al. | 99—56 |
| 1,236,700 | 8/1917 | Gere | 99—56 |
| 783,015 | 2/1905 | Britt | 99—56 |
| 3,164,473 | 1/1965 | Shields et al. | 99—56 |
| 3,728,127 | 4/1973 | Palmer | 99—56 X |

OTHER REFERENCES

Carnation Company; Carnation Instant Breakfast Formula; Effective date June 1963, Ziehn.

ROBERT L. LINDSAY, JR., Primary Examiner

R. M. SCHOR, Assistant Examiner

U.S. Cl. X.R.

99—56; 426—1